Figure 1:
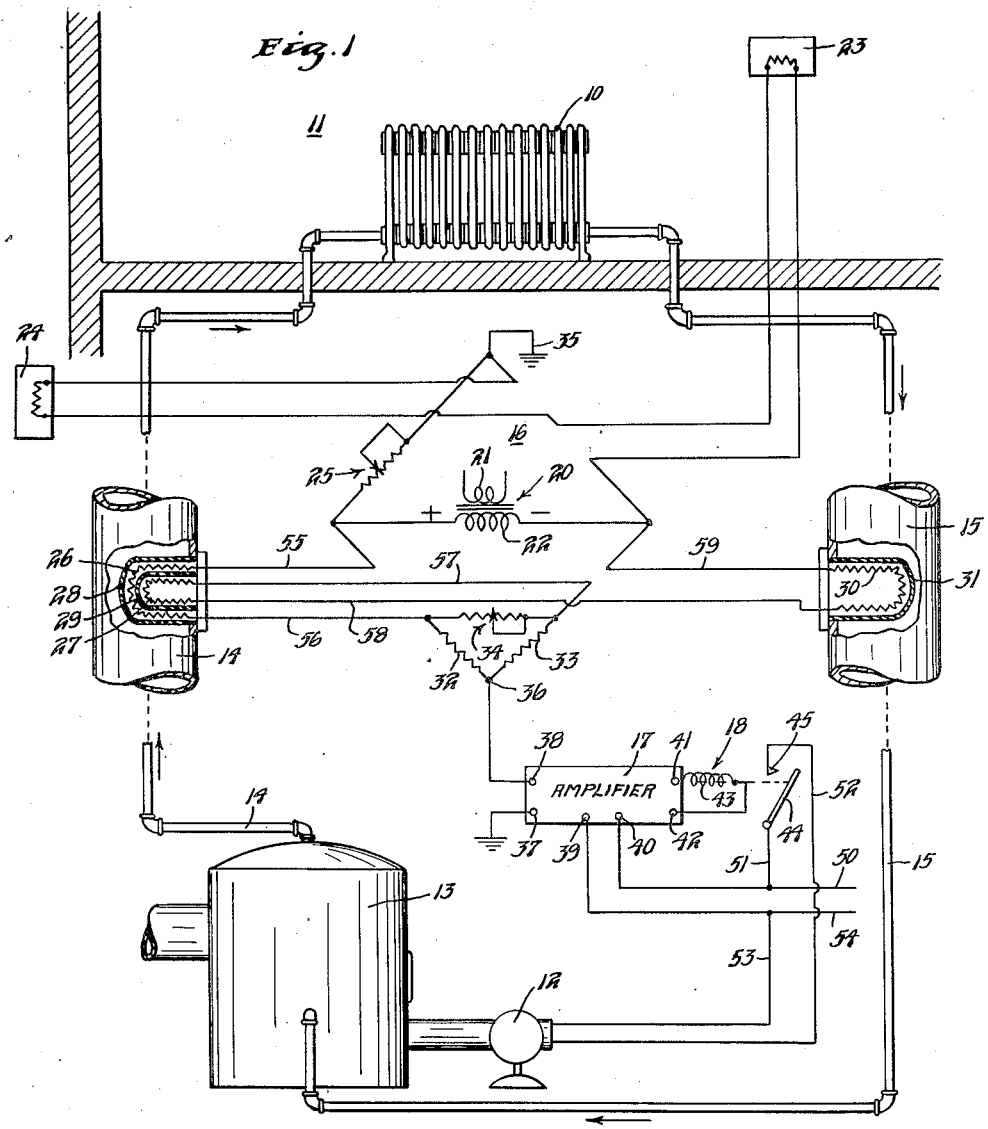

July 8, 1952 J. M. WILSON ET AL 2,602,591
CONDITION CONTROL APPARATUS
Filed Nov. 15, 1948 2 SHEETS—SHEET 2

Inventors
JOHN M. WILSON
STANLEY W. NICKELLS
By
George H. Fisher
Attorney

Patented July 8, 1952

2,602,591

UNITED STATES PATENT OFFICE 2,602,591

CONDITION CONTROL APPARATUS

John M. Wilson, Minneapolis, and Stanley W. Nickells, St. Louis Park, Minn., assignors to Minneapolis-Honeywell Regulator Company, Minneapolis, Minn., a corporation of Delaware Application November 15, 1948, Serial No. 60,012

13 Claims. (Cl. 236—91)

1

The present invention relates to condition control apparatus and particularly to that type of control apparatus wherein it is desired to maintain a desired condition, such as temperature, within a given space.

It has been found in some present day condition control apparatuses that in order to maintain a desired condition it is necessary to cycle the condition changing apparatus on and off at a predetermined rate. This cycling may be brought about by measuring the rate at which the condition changing medium is supplied to maintain the desired condition so that an anticipating effect will result. In using an electrical network of the Wheatstone bridge type, with condition sensing resistors used to detect the rate of supply of the condition changing medium there is a tendency for the rate responsive resistors to get out of step and cause uneven periods of short cycling by creating false indications of a need for a new operating cycle. After a number of these short cycles the condition being controlled will vary sufficiently so that a main controller will take over and there will be a large or long period during which the condition changing apparatus will be inoperative. This type of operation will result in wide swings in the controlled condition from the desired control point which is very undesirable.

The present invention proposes eliminating these wide swings of control temperature by providing means which will prevent the rate responsive resistors of a control bridge from becoming out of step or becoming effective for a certain period of time.

It is therefore an object of the present invention to provide a condition control apparatus which is measuring the rate of supply of a heating medium and providing therewith means for preventing the rate responsive portion of the apparatus from becoming effective until a desired condition exists in the control network.

A further object of the present invention is to provide a condition control apparatus which employs a rate responsive apparatus and a load measuring apparatus to maintain a desired condition in a given space.

Still another object of the present invention is to provide a condition controlling apparatus which employs a control network responsive to the rate of supply of the heating medium to a given space and providing therewith a timer which will prevent the rate responsive elements from getting out of step.

Figure 2:
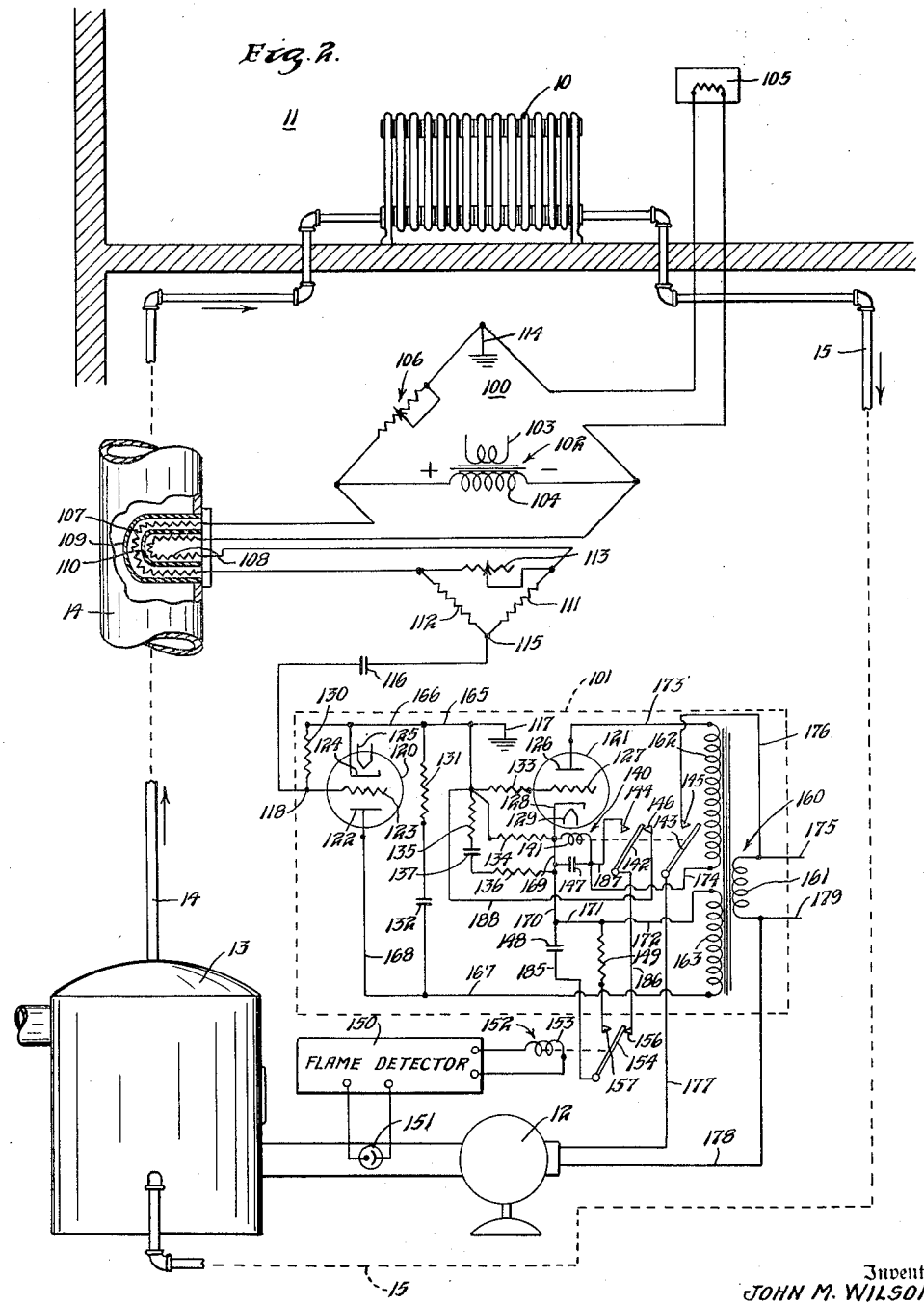

These and other objects of the present invention will be obvious from a consideration of the following specification, claims and appended drawing of which:

Figure 1 represents the present invention as applied to a temperature control apparatus wherein means are provided for measuring the rate of supply of heat to a space and the load demand of the space whose temperature is being controlled; and Figure 2 represents a modification of the invention employing a timer which prevents the rate responsive portion of the control apparatus from becoming effective until a predetermined time interval has passed and which time interval will be such as to prevent the rate responsive portion from becoming out of step.

Referring now to Figure 1 the numeral 10 represents a heat exchange surface such as a radiator which is used to supply heat to the area indicated generally at 11. The source of heat for the radiator 10 is provided by a burner 12 which is used to supply heat to a furnace 13. Conducting of the heating medium away from the furnace 13 is accomplished by a conduit 14 which is connected to the intake side of the radiator 10 and conducting the heating medium away from the radiator 10 is a further conduit 15 which terminates in the furnace 13.

For indicating the need for operation of the burner 12 a control network 16 is provided whose output is connected to an electronic amplifier indicated at 17. The amplifier 17 is operative when the output signal from the control network 16 is of a first value to initiate energization of the relay 18 which in turn will cause energization of the burner 12. When the control network no longer indicates a need for the supplying of heat the output voltage will have changed and the amplifier 17 will have an output which will not be sufficient to maintain the relay 18 energized and the relay when deenergized will no longer maintain the burner 12 in an energizing circuit.

The control network 16 is a balanceable electrical network of the Wheatstone bridge type and has as a source of power a transformer 20 having a primary winding 21 which may be connected to any suitable source of power and a secondary winding 22. The temperature sensing resistor elements of the control bridge include a resistance 23, having a relatively large temperature coefficient of resistance which is located in the space 11 wherein is located the radiator 10. Located in the same portion of the control bridge as the resistor 23 is an outdoor temperature sensing resistor 24 which also has a relatively large temperature coefficient of resistance. Located in the lower portion of the control bridge 16 are temperature sensing resistors 26 and 27 located in a housing 28 which is positioned in the radiator supply conduit 14, shown in enlarged section. An insulating or lagging material 29 is used to separate the resistors 26 and 27. Also located in the lower portion of the bridge 16 is temperature sensing resistor 30 which is located within the housing 31 and which in turn is positioned within the heating medium return conduit 15, which is shown in enlarged section. A pair of fixed resistors 32 and 33 and a rheostat 34 are provided for varying the controlling effect of the lower portion of the bridge 16 upon the output of the control bridge.

Output terminals for control bridge 16 are provided by ground terminal 35 and an output terminal indicated at 36 and these output terminals are connected to input terminals 37 and 38 respectively of amplifier 17. Input power lines are connected to the amplifier 17 at terminals 39 and 40 and the relay 18 is connected to amplifier output terminals 41 and 42. The relay 18 consists of a relay winding 43 which is operative to move, when energized, a switch blade 44 into engagement with its associated switch contact 45, the switch blade being biased by any suitable means (not shown) out of engagement with contact 45.

*Operation of Figure 1*

In considering the operation of Figure 1, it is best to consider first the association of the temperature sensing resistors in the control bridge 16. Assuming the resistors of each leg of the lower portion of the bridge are equal and the half cycle of operation in which the polarity of the transformer secondary is as indicated with the left hand terminal positive and the right hand terminal negative, a decrease in temperature of the space temperature sensing resistor 23, with a positive temperature coefficient of resistance, will result in the bridge being unbalanced so that the ground terminal 35 will be negative and the other output terminal 36 will be positive. Similarly, in considering the action of the outdoor resistor 24, assuming the same conditions as above, a decrease in the temperature of the resistor 24 will tend to cause the output voltage of the control bridge to be negative on the ground terminal 35 and positive on the output terminal 36 in the same manner as was caused by a decrease in the temperature of the space temperature resistor 23.

With the balanced condition on the output terminals of the control bridge 16 there will be no indication for a need for operation of the burner 12. Should there be a drop of the room temperature the resistance change of the space temperature sensing resistor 23 will be such as to unbalance the bridge as indicated above and there will be an indication for the need for operation of the burner 12. Neglecting for the moment the functioning of the resistors in the lower portion of the bridge 16, the unbalance of the bridge caused by the change in temperature of the resistor 23 will result in an output signal which will cause the amplifier 17 to energize the relay 18 so that the switch blade 44 is moved into engagement with its switch contact 45. When the switch blade 44 engages switch contact 45 an electrical circuit will be completed to the burner 12 and this circuit may be traced from the input power line 50 through conductor 51, switch blade 44, switch contact 45, conductor 52, burner 12, and conductor 53 back to the other input power line 54. With the burner 12 now energized there will be heat supplied to the interior of the furnace 13 and the heating medium of the system will be heated and will flow through the conduit 14 to the radiator 10, where it will lose a greater portion of the heat transferred to it by the furnace 13, and back to the conduit 15 to the furnace 13. With heat supplied to the space 11 the temperature of the resistor 23 will begin to rise and the bridge 16 will be brought back into balanced condition. A decrease in the outdoor temperature as sensed by the temperature sensing resistor 24 will result in the unbalancing of the control bridge in the same direction, as pointed out above, and again the burner 12 will be brought into operation and it will stay in operation until such time as the room temperature indicated by the resistor 23 has increased sufficiently to overcome the unbalance created by the decrease in resistance of the outdoor resistor 24. This rise in the indoor temperature is desirable with a decreasing outdoor temperature because of the cooling of the walls and the change in the radiating effect the walls will have upon the occupants of the room or the space 11. In actual practice this compensating resistor 24 is actually relatively small when compared with the resistance of the resistor 23 so that the change in control point or space temperature of the space 11 will be relatively small for large changes of outdoor temperature as sensed by the resistor 24.

As yet no consideration has been given to resistors in the lower half section of the control bridge 16. Here, located in housing 28 are resistors 26 and 27 both of which have a positive temperature coefficient of resistance. The resistor 26 is located very closely to the surface of the housing 28 and therefore responds relatively quickly to changes in temperature of the heating medium flowing in the supply conduit 14. The resistor 27 is separated from the resistor 26 by insulation or lagging material 29 which has the effect of causing the resistor to respond relatively slowly to changes in the temperature of the heating medium flowing in the supply conduit 14. These resistors are connected in opposite legs of the control bridge so that it will be possible to obtain a rate of supply of the heating medium signal. The resistor 26 is actually connected to the left hand portion of the bridge under consideration by conductors 55 and 56 while the resistor 27 is connected to the right hand portion of the bridge under consideration by conductors 57, 58, resistor 30, whose action shall be considered below, and conductor 59. The reason a rate measuring signal is obtained may be seen when it is considered that upon the energization of the burner 12, upon a heat demand condition indicated by the bridge 16, the heating medium in the supply conduit 14 will be increasing in temperature and this increase in temperature will be detected by the resistor 26 which is unlagged and its increase in resistance will tend to eliminate the unbalance calling for operation of the burner 12. The temperature of the resistance 27 will begin to follow that of the resistance 26 and will tend to counteract the rebalancing caused by the resistance 26. However, the resistor 27 will not increase in temperature at the same rate as the increase in temperature of the resistor 26 and therefore their temperatures will continue to separate until such time as the resultant unbalance of the control bridge due to these resistors has removed the unbalance calling for operation of the burner 12.

When the burner 12 is cut off upon the rebalancing of the bridge 16, the temperature of the heating medium flowing in the supply conduit 14 begins to decrease and the temperature of the resistance 26 will begin to drop at approximately the same rate. The temperature of the resistance 27 will tend to follow the temperature of the resistor 26 and if the resistance of the resistors 26 and 27 are the same and there is lagging between the two, their temperatures will become equal at some temperature point higher than the initial point and the resistance 26 will continue to cool faster than the resistor 27 so that a demand for heat will be created by the unbalance of the bridge 16. If the respective temperatures of the resistors 26 and 27 are higher at the time they create a demand for heat than they were at start of the initial cycle, the temperature at which they will create a demand for heat will continue to rise in the subsequent cycles of their heating and cooling upon the energization and deenergization of the burner 12. Assuming constant load demand, this continuous rise in the supply temperature will cause the room or space 11 to overheat and the space resistor 23 will become heated to a point where it overbalances the action of the resistors 26 and 27 and the burner 12 will then remain shut off for relatively long period of time until the room 11 and resistor 23 cools off. In other words, the resistors 26 and 27 will cause a number of successively shorter operating cycles of the burner 12 or cycles of increased frequency as the resistors 26 and 27 tend to become out of step until the space temperature of the room 11 overheats or overshoots the desired control point at which time the resistor 23 shuts the burner down for a long period of time. This obviously is an undesirable condition as the space temperature will be varying over wide ranges with the uneven lengths of operation of the burner 12.

One method of preventing this undesirable condition is to take a portion of the resistor 27 and place it in the return conduit 15 and this is what has been done by the addition of the resistor 30 in the control bridge. This resistor 30, located in housing 31, is an unlagged resistor, or one which is adapted to follow closely the changes in temperature of the heating medium flowing in the return conduit 15. It has been found that with constant load conditions, the temperature of the heating medium in the return line or conduit is relatively constant and so with resistor 30 located so as to be subjected to this constant temperature, the right hand lower portion of the bridge 16 is effectively tied to a fixed reference in the heating medium. This constant reference added to the lagged reference of resistor 27, when opposed by the unlagged resistance of resistor 26, prevents the effective temperature difference between the resistors 26 and 27 from becoming effective to create a heat demand condition until the temperature of the resistances have reached, a temperature corresponding to that on the start of the heating cycle. This will mean that the time intervals between the heat demand and no heat demand conditions, with constant load, will be constant and the space temperature will not vary over the wide ranges as would occur if the resistors 26 and 27 were used alone.

It has further been found that with changes in the load demand conditions of the temperature control apparatus that the temperature of the water in the return line or conduit 15 changes accordingly. Therefore, with an increase in demand for heat by the temperature control system there will be a corresponding increase in the temperature of the heating medium flowing in the return conduit 15. There will likewise be an increase in the temperature of the heating medium flowing in the supply conduit 14 only this supply temperature will be greater than the temperature of the heating medium in the return line and the differences between the temperatures flowing in the two conduits will increase with increases in load demand. With this in mind, it may be seen that by varying the ratios between the amount of resistance positioned in the return conduit and the supply conduit, there will be a compensating action by the resistor 30 which will tend to change the control point of the system. For example, if the resistor 26 were 500 ohms and the resistor 30 were 600 ohms, an increase of 10 degrees in the supply conduit might mean an increase of 5 degrees in the return conduit. The 10 degree increase on the resistor 26 might cause a 10 ohm increase and the 5 degree increase on the 600 ohm resistance of resistor 30 might cause a 10 ohm increase and therefore the control point of the system would not be affected by the increase in load represented by the increased temperatures of the supply and return conduits. Carrying the example further, if the resistor 26 were 500 ohms and the resistor 30 were 700 ohms and again a 10 degree increase was had in the supply conduit and a 5 degree increase in the return conduit, the change in resistance of the resistor 26 would be 10 ohms but this time the change of resistor 30 would be 12 ohms and therefore the control point of the system would be caused to shift by the 2 ohms introduced by the resistor 30 and this 2 ohm increase, in this example, would cause a rise in the control point of the system. By varying the resistance of the resistor 30 the system may be under or over-compensated as the load conditions change as represented by the changes in temperature of the heating medium flowing in the return conduit.

It may therefore be seen that the subject apparatus provides in resistors 26 and 27 a signal or measure of the rate of supply of the heating medium flowing to the radiator 10 while the resistors 26 and 30 give a signal or measure of the load or amount of heat lost in the radiator 10, which loss is necessary to maintain the desired temperature in the space 11. This will mean that the cycling rate of the burner 12 will be constant for constant load conditions and will vary with changes in load as determined by the heating and cooling of the resistors 26 and 27 and the temperatures sensed by the resistors 26 and 30.

In considering the entire control bridge 16, the space resistor 23 is the main control element and wide changes in space temperature will cause this resistor to take control of the bridge and the burner 12 until the temperature has reached a certain range and as soon as this range has been reached the rate and load measuring resistors 26, 27 and 30 become effective to maintain the control point within very close limits. The effect of the outdoor resistor 24 is to modify the range of effectiveness of the space resistor 23 and, as pointed out above, is selected primarily to increase the control point or range of effectiveness of the room resistor 23 with decreases in outdoor temperature. Rheostat 25 is the calibration device of the apparatus and determines the initial control point while the rheostat 34 is used to vary the effect the resistors 26, 27 and 30 will have on the entire control network.

Figure 2

The apparatus disclosed in Figure 2 is again directed to an apparatus to control the flow of the heating medium to a radiator 10 which in turn is a heat exchanger for the space 11. The burner 12 is operative when energized to supply flame to the furnace 13 and the heating medium is heated therein and passed through a supply conduit 14 to the radiator 10 and from the radiator 10 the heating medium is returned by means of a conduit 15 to the furnace. The control network for the apparatus of Figure 2 is a balanceable electrical network 100 whose output terminals are connected to an amplifier and timer located within the housing 101 and which amplifier is operative to cause energization of the burner 12 whenever the control network 100 indicates a need for such operation.

The control network 100 may be seen to consist of a transformer 102 having a primary winding 103 which may be connected to any suitable source of power at a secondary winding 104. A temperature sensing resistor 105 is located in the space 11 and this resistor is selected to have a relatively large temperature coefficient of resistance. The calibration of the apparatus is accomplished by a rheostat 106. Two further temperature sensing resistors 107 and 108 are located in a housing 109 which is threadedly engaged within the supply conduit 14 so as to be in close association with the heating medium flowing in the conduit 14. An insulating or lagging material 110 is located between the resistors 107 and 108. Fixed resistors 111 and 112 and the rheostat 113 are used to control the effect the resistors 107 and 108 will have upon the overall control network. Output terminals for the control network are provided at ground terminal 114 and at terminal 115. The ground terminal 114 is effectively connected to the ground terminal 117 within the amplifier housing 101 and the output terminal 115 is connected through a condenser 116 to an input terminal 118 on the amplifier 101. The amplifier 101 may be seen to consist of a pair of electron discharge devices indicated at 120 and 121. The discharge device 120 may be seen to consist of an anode 122, a control electrode 123, and a cathode 124 which is heated to be electron emissive by a heater 125. The discharge device 121 may be seen to consist of an anode 126, a control electrode 127 and a cathode 128 which is heated to be electron emissive by an appropriate heater 129. Connected between the control electrode and cathode of discharge device 120 is a grid resistor 130. Resistors 131 and condenser 132 are connected in series to form a biasing circuit for the discharge device 121. A resistor 133 is provided as a grid current limiting resistor on the discharge device 121. Located in the plate current circuit of the discharge device 120 and associated with the biasing circuit of the discharge device 121 is resistor 134. Also directly associated with this resistor 134 are a pair of resistors 135 and 136 and a condenser 137.

Located in the conductive circuit of the discharge device 121 is a relay 140 which has a relay winding 141 which is operative when energized to move a pair of switch blades 142 and 143 into engagement with their associated contacts 144 and 145. When the relay is deenergized the switch blade 142 is biased into engagement with contact 146 by means not shown. A condenser 147 is provided for bypassing the alternating current flowing in the plate circuit of the discharge device 121. A condenser 148 and a resistor 149 function in a timing capacity in a manner to be explained below. For indicating the length of time the burner has been in operation when it is rendered operative by the amplifier 101 a flame detector 150 is provided. This flame detector is rendered operative by a photocell 151 which when sensing a burner flame will cause the flame detector 150 to energize a relay 152. The relay 152 may be seen to consist of a winding 153 which is operative when energized to move a switch blade 154 from engagement with its associated contact 156 into engagement with a further contact 157, the last mentioned contacts being directly associated with the timing device of the apparatus. The source of power for the subject apparatus is a transformer 160 which has a primary winding 161 connected to a suitable source of power and a pair of secondary windings 162 and 163.

Operation of Figure 2

In considering the operation of the apparatus of Figure 2, assume first that the lower portion of the control network 100, which is a Wheatstone bridge, is balanced. If the temperature of the space 11 should drop the temperature of the resistor 105 will drop and if it has a positive temperature coefficient of resistance, with the secondary 104 phased to be positive on the left hand terminal and negative on the right hand terminal, there will be an unbalance of the network 100 and the output voltage will appear on the network output terminals with the ground terminal 114 being negative and the other output terminal 115 being positive. With this output voltage on the output of network 100 there will be an input voltage on the input of discharge device 120. This circuit may be traced from the control electrode 123 through terminal 118, condenser 116, terminal 115, network 100, ground output terminal 114, ground 117, and conductors 165 and 166 to the cathode 124 of discharge device 120. This will mean that the control electrode 123 will be positive with respect to the cathode 124 with the unbalance and phasing as indicated above.

With the control electrode positive it will be necessary to have the anode 122 on its positive half cycle in order for the discharge device 120 to become conductive and this may be accomplished by phasing the secondary 163 so that the upper terminal is negative and the lower terminal is positive at the same time that the secondary 104 is phased as indicated above. When the discharge device 120 is conductive the current flow circuit may be traced from the lower terminal of secondary 163 through conductors 167 and 168, anode 122, cathode 124, conductors 166 and 165, resistor 134, and conductors 169, 170, 171 and 172 back to the upper terminal of the secondary 163. With current flowing in the circuit last traced there will be a voltage drop across the resistor 134 so that its left hand terminal is positive and its right hand terminal is negative. This voltage drop will in turn charge the condenser 137 which is effectively connected in parallel with the resistor 134 by a circuit which may be traced from the left hand terminal of resistor 134, resistor 135, condenser 137, resistor 136 and conductor 169 to the right hand terminal of resistor 134. This condenser will be charged to a value corresponding to the voltage drop across the resistor 134. The charge on this condenser 137 must be sufficient to overcome the fixed biasing voltage that is applied to the discharge device 121.

The fixed biasing voltage on tube 121 is an alternating current bias that effectively causes the control electrode 127 to be biased negatively when the anode 126 is on the conducting half cycle of the power supply. This fixed biasing circuit may be traced from the control electrode 127 through resistor 133, conductor 165, resistor 131, condenser 132, and conductor 167 to the lower portion of the secondary 163. The upper portion of the secondary 163 is connected directly to the cathode 128 by a circuit that may be traced from the upper terminal of secondary 163 through conductors 172, 171, 170 and 169. If the bias on condenser 137 is sufficient to overcome the fixed alternating current by a circuit, just traced, the discharge device 121 will become conductive and a current flow circuit may be traced from the upper terminal of the secondary 162 through conductor 173, anode 126, cathode 128, relay winding 141, and conductor 174 to the lower terminal of the secondary 162. With current flowing in the last traced circuit the relay winding 141 will move the switch blades 142 and 143 into engagement with their associated switch contacts 144 and 145.

When the relay 140 becomes energized, and the switch blade 143 engages switch contact 145, there will be a circuit completed to the burner 12 that may be traced from the input power line 175 through conductor 176, switch contact 145, switch blade 143, conductor 177, burner 12 and conductor 178 back to the other input power line 179. When the burner 12 is energized there should be a flame within the furnace 13 which will be detected by the photocell 151 and which in turn will cause the flame detector 150 to energize the relay 152 whose function in the apparatus will be considered below.

With a flame within the furnace 13, heat will be applied to the heating medium and the same will rise in the conduit 14 to the radiator 10. Upon a change in the temperature of the heating medium flowing in the conduit 14 there will be a further signal introduced into the control network 100 by the resistors 107 and 108. The resistor 107 is located against the surface of the housing 109 and is adapted to change temperature relatively quickly with changes in temperature of the heating medium flowing in the conduit 14. The resistor 108, separated from the resistor 107 by the lagging or insulating material 110, is adapted to respond to changes in temperature of the heating medium relatively slowly as compared to that response of resistor 107. Therefore, the temperature of the resistor 107 will follow the temperature of the heating medium as it increases, the resistance of resistor 107 will increase and will tend to unbalance the bridge 100 in a direction opposite that caused by the cooling of the space resistor 105. However, the resistor 108 will also begin to feel the temperature of the heating medium and will begin to increase in resistance and this increase will tend to counteract the effect of the resistor 107. The action of the resistor 108 will be sufficiently delayed by the lagging material 110 that the resistor 107 will increase in resistance at a rate greater than that of resistance 108 and when their differential has become great enough the bridge will be rebalanced and there will be no output voltage on the network output terminals calling for operation of the burner 12.

When there is no call for operation of the burner 12 the amplifier will no longer maintain the relay 140 energized and a switch blade 143 will move out of engagement with the switch contacts 145 to open the energizing circuits to the burner 12. Upon cutting off the burner 12 the heating medium flowing in the conduit 14 will begin to drop in temperature and this drop will be followed by the change in resistance of the resistor 107. The resistor 108 is attempting to reach the same temperature as the resistor 107 and if it should reach this same temperture at a temperature that is above that of the initial starting temperature, all succeeding cycles will attempt to become shorter. These cycles will become shorter until such time as the heating medium flowing in the conduit 14 has reached a relatively high value which will cause the temperature of the space 11 to considerably overshoot the desired control point and the resistor 105 will become effective to, upon being heated, maintain the burner 12 inoperative for a relatively long period. The action here is almost identical to that explained in respect to Figure 1 and resistors 26 and 27 prior to the consideration of the effect of resistor 30. These large swings in control point are very undesirable and therefore in the present modification it is proposed to eliminate the short cycling of the apparatus to prevent the ratios of the resistors 107 and 108 from becoming effective until a predetermined time interval has passed.

In this modification, the apparatus is prevented from getting out of step by providing a timer to give variable off timing which is inversely proportional to the on time. This timing apparatus has been incorporated with the amplifier circuits and its operation may be understood when it is noted that when the relay 140 becomes energized upon the bridge 100 indicating a need for operation of the burner 12, the switch blade 142 engages switch contact 144. When this occurs the condenser 148 is connected in parallel with the relay winding 141 and condenser 147 by a circuit that may be traced in the left hand terminal of winding 141 through conductors 169, 170, condensers 148, conductor 185, switch blade 154, switch contact 156, conductor 186, switch blade 142, switch contact 144 and conductor 187 to the right hand terminal of the winding 141. The condenser 148 will be charged so that its upper terminal is positive and its lower terminal is negative. As soon as the burner 12 is brought into operation the flame detector 150 will energize the relay 152 so that the winding 153 will move switch blade 154 into engagement with switch contact 157. The switch blade 154 will move out of engagement with contact 156 and will open the charging circuit for the condenser 148 and the closing of the switch blade 154 with contact 157 will connect the condenser 148 in a discharging circuit which includes resistor 149 and which may be traced from the upper terminal of the condenser 148 through conductor 171, resistor 149, switch contact 157, switch blade 154, and conductor 185 back to the lower terminal of the condenser 148. The resistor 149 is relatively large and therefore the discharging of the condenser 148 through the resistor will be relatively slow. The amount of charge that will remain on the condenser 148 will be dependent upon the length of time that the switch blade 154 engages switch contact 157. As soon as the resistors 107 and 108 are of such resistance as to indicate no further need for operation of the burner 12, as indicated above, the relay 140 will become deenergized and the switch blades 142 and 143 will move out of engagement with their respective contacts 144 and 145. When the burner 12 has been deenergized the flame detector will no longer detect flame and the relay 152 will no longer maintain switch blade 154 in engagement with switch contact 157. With both relays 152 and 140 deenergized the condenser 148 will be connected in another discharging circuit in such a manner as to bias the control electrode 127 of discharge device 121 negative to prevent the same from being reenergized until the condenser 148 has discharged. This circuit may be traced from the cathode 128 through conductors 169, 170, condenser 148, conductor 185, switch blade 154, switch contact 156, conductor 186, switch blade 142, switch contact 146, conductor 188 and resistor 133 to the control electrode 127. The discharging of the condenser 148 will now take place through the resistor 134 which is connected between the control electrode 127 and the cathode 128. The length of time that the condenser 148 will be able to bias the discharge device 121 to be nonconductive will of course depend upon the amount of charge that remains on the condenser after having discharged through the resistor 149 while the apparatus was in operation. Obviously if the condenser was discharged only a short time through the resistor 149 due to a short operating cycle of the burner 12 the condenser would retain sufficient charge to maintain the discharge device 121 non-conducting for a considerable length of time. The function of this timer then is to vary the off timings of the burner 12 so that they are inversely proportional to the on time of the burner 12.

The on time is in effect a measure of the load demand of the system so if the on time is short the indication is that the load is light and it is therefore desired that the apparatus should not again be rendered operative for a predetermined length of time so that a desired temperature will be maintained in the space 11. This will mean that the tendency for the resistors 107 and 108 to get out of step and create a demand for heat before it is actually needed will cause the apparatus, over a period of cycles, to overshoot the control point unless something is provided to keep the resistors 107 and 108 ineffective until the desired condition is realized. In Figure 1, this condition was taken care of by the resistor 30 in the return conduit 15. Here, in Figure 2, the timer of the apparatus, also giving a measure of load, maintains the burner inoperative for a period of time dependent on the load demand of the system. As the load varies there will obviously be a varying of the timing at which the amplifier is rendered inoperative to energize the burner control relay so that the adverse condition of the resistors 107 and 108 causing the system to get out of step and create a false demand for heat is eliminated and a desired temperature may be maintained without causing the large swing in control point that would otherwise occur.

From the foregoing, it may be seen that we have provided a control apparatus for maintaining a desired temperature in a given space which measures the rate at which the heating medium is supplied to the space to anticipate the needs of the space and measures the load demand of the system so that the off times may be varied in accordance with the load. While we have disclosed our apparatus in connection with a temperature control apparatus, and while it is particularly well suited for use there, it will be obvious to those skilled in the art that our apparatus has use in many fields of condition control and therefore we intend to be limited solely by the scope of the appended claims.

We claim as our invention:

1. In a temperature control apparatus; relay means adapted when energized to initiate the flow of a temperature changing medium through a heat exchange apparatus; electrical circuit means responsive to the need for operation of said relay means, said circuit means comprising a first impedance responsive to the temperature of the medium supplied to the heat exchange apparatus, a second impedance responsive to the temperature of the medium leaving the heat exchange apparatus, a third impedance lagged with respect to said first impedance responsive to the temperature of the medium supplied to the heat exchange apparatus, and means connecting said impedances in said circuit so that said circuit gives a measure of the rate of change of temperature of the medium supplied to the heat exchange apparatus and the heat lost by the medium in the heat exchange apparatus; and means connecting said circuit means to said relay means so that said relay means will be energized upon said circuit calling for a flow of temperature changing medium.

2. In a temperature control apparatus, relay means adapted when energized to initiate the flow of a temperature changing medium through a heat exchange apparatus, electrical circuit means responsive to the need for operation of said relay means, said circuit means comprising a balanceable network having a first impedance responsive to the temperature of the medium supplied to the heat exchange apparatus opposed by a second impedance responsive to the temperature of the medium leaving the heat exchange apparatus and a third impedance responsive to the temperature of the medium supplied to the heat exchange apparatus and lagged with respect to said first impedance, and means connecting said circuit means to said relay means so that said relay means will be energized upon said circuit calling for a flow of temperature changing medium.

3. In a temperature control apparatus, relay means adapted when energized to initiate the flow of a temperature changing medium through a heat exchange apparatus, electrical circuit means responsive to the need for operation of said relay means, said circuit means comprising an electrical bridge having a first impedance responsive to the temperature of the medium supplied to the heat exchange apparatus opposed by a second impedance responsive to the temperature of the medium leaving the heat exchange apparatus and a third impedance responsive to the temperature of the medium supplied to the heat exchange apparatus and lagged with respect to said first impedance, and means connecting said circuit means to said relay means so that said relay means will be energized upon said circuit calling for a flow of temperature changing medium.

4. In an apparatus for maintaining a desired temperature in a given space, relay means when operative for controlling the flow of heating medium to the space and when inoperative for cutting off the flow, circuit means for sensing the need for the flow of heating medium, said circuit means comprising a first temperature responsive impedance responding relatively quickly and a second temperature responsive impedance responding relatively slowly to the temperature of heating medium flowing to the given space and effective when the ratio between said impedances is of a first value to render said relay means operative and when of a second ratio to render said relay means inoperative and an electrical device connected to said circuit means for maintaining said circuit means ineffective until the temperature of the heating medium responded to by said impedances has reached a value consistent with the load demand of said apparatus.

5. In an apparatus for maintaining a desired temperature within a given space, relay means when operative for initiating the flow of a heating medium to the space and cutting off the flow when inoperative, an electrical bridge connected in controlling relation to said relay means, said bridge comprising a pair of impedances whose impedances vary with changes in temperature one of which responds relatively quickly and the other of which responds relatively slowly to changes in the temperature of the heating medium and adapted to cause said bridge to render said relay means operative when the ratio of the temperatures of said impedances is of a first value and rendering said relay means inoperative when said ratio is of a second value, a delay device, and means including said delay device connected in controlling relation to said relay to render said relay ineffective for time periods inversely proportional to the periods of operation of said relay means.

6. In an apparatus for maintaining a desired temperature within a given space; relay means for initiating the flow of heating medium to the space; an electrical bridge for indicating the need for operation of said relay means, said bridge comprising first, second, and third impedances whose impedances vary with changes in temperature, means positioning said first impedance to respond relatively quickly to the temperature of the medium supplied to the space, means positioning said second impedance to respond relatively quickly to the temperature of the heating medium leaving the space, means positioning said third impedance to respond relatively slowly to the temperature of the heating medium supplied to the space, and means connecting said first, second, and third impedances in said bridge to give a measure of load demand of the space and rate of supply of the heating medium to the space to cause said bridge to cyclically indicate the need for operation of said relay means at a rate determined by load demand and rate of supply of the heating medium, and means connecting said bridge to said relay means.

7. In an apparatus for maintaining a desired temperature within a given space; relay means for initiating the flow of heating medium to the space; an electrical bridge for indicating the need for operation of said relay means, said bridge comprising first, second, and third impedances whose impedances vary with changes in temperature, means positioning said first impedance to respond relatively quickly to the temperature of the medium supplied to the space, means positioning said second impedance to respond relatively quickly to the temperature of the heating medium leaving the space, means positioning said third impedance to respond relatively slowly to the temperature of the heating medium supplied to the space, means connecting said first, second, and third impedances in said bridge to give a measure of load demand of the space and rate of supply of the heating medium to the space to cause said bridge to indicate the need for operation of said relay when the ratios between said impedances is of a first set of values and no further need for operation when of a second set of values, and means including said second impedance for varying the time when the ratio of said first and third impedances becomes effective to indicate further need for operation of said relay in accordance with load demand; and means connecting said bridge to said relay means to operate said relay in accordance with the ratios of said impedances.

8. A temperature control apparatus, comprising in combination, means for initiating the flow of a temperature changing medium through a heat exchange apparatus, a control device responsive to a need for operation of the initiating means, said device comprising a pair of temperature responsive devices, one of which is solely responsive to the temperature of the heating medium supplied to the heat exchange apparatus and the other of which is responsive to a combination of the direct temperature of the heating medium leaving the heat exchange apparatus and a lagged temperature of the heating medium supplied to the heat exchange apparatus, and means connecting said control device to said initiating means so that said initiating means will be energized upon said device calling for a flow of temperature changing medium.

9. In an apparatus for maintaining a desired temperature within a given space, the combination comprising, means when operative for initiating the flow of heating medium to the given space, a control device responsive to the need for operation of said initiating means connected to control said initiating means, said device comprising a temperature responsive means having a relatively quick temperature response and a further temperature responsive means having a relatively slow temperature response, both of said temperature responsive means responding to the temperature of the heating medium flowing to the given space and effective when the ratio between their respective temperatures is of a first value to render said initiating means operative and when of a second value to render said initiating means inoperative, and an electrical delay device connected in controlling relation to said initiating means for maintaining said initiating means ineffective when the temperature ratios of said responsive means are inconsistent with load demand.

10. In an apparatus for maintaining a desired temperature in a given space, relay means when rendered operative for controlling the flow of heating medium to the space and when inoperative for cutting off the flow to the space, circuit means for sensing the need for the flow of heating medium connected to control said relay means, said circuit means comprising a first temperature responsive impedance responding relatively quickly, a second temperature responsive impedance responding relatively slowly to the temperature of heating medium flowing to the given space and effective when the ratio between said impedances is of a first value to initiate operation of said relay means and when of a second value to render said relay means inoperative, and space temperature responsive means, and an electrical control device connected to said circuit means to maintain said relay means inoperative until the temperature of said impedances has a value consistent with the load demand of said apparatus.

11. In an apparatus for maintaining a desired condition in a given space, relay means when operative for controlling the flow of condition changing medium to the space and cutting off said flow when inoperative, circuit means for sensing the need for the flow of condition changing medium connected to control said relay means, said circuit means comprising a first impedance whose impedance varies relatively quickly and the second impedance whose impedance varies relatively slowly with respect to the condition of the condition changing medium and effective when the ratios of said impedance is of a first value to render said relay operative and when of a second value to render said relay means inoperative, and an electrical control device connected to said circuit means to maintain said relay means inoperative until the condition of the condition changing medium responded to by said impedances has reached a value consistent with the load demand of said apparatus.

12. In an apparatus for maintaining a desired condition in a given space, relay means when operative for controlling the flow of condition changing medium to the space and cutting off the flow when inoperative, circuit means for sensing the need for the flow of condition changing means connected to control said relay means, said circuit means comprising a first impedance whose impedance varies relatively quickly and a second impedance whose impedance varies relatively slowly with respect to the condition of the condition-changing medium and effective when the ratio of said impedances is of a first value to render said relay means operative to initiate the flow of condition changing medium and when of a second value to render said relay means inoperative, and an electrical time delay device connected to said circuit means to maintain said relay means ineffective until the condition of the condition changing medium responded to by said impedances has reached a value consistent with the load demand of said apparatus.

13. In a temperature control apparatus, relay means adapted when energized to initiate the flow of a temperature changing medium whose temperature changes when flowing to and through a heat exchange apparatus, electrical circuit means responsive to the need for operation of said relay means, said circuit means comprising, means responsive to the temperature condition adjacent to said heat exchange apparatus, temperature variable impedance means responsive to the rate of change of the temperature of the temperature changing medium supplied to the heat exchange apparatus and the temperature of the temperature changing medium after passing through the heat exchange apparatus, and means connecting said circuit means to said relay means so that said relay means will be energized upon the circuit calling for a flow of temperature changing medium.

JOHN M. WILSON.
STANLEY W. NICKELLS.

REFERENCES CITED

The following references are of record in the file of this patent:

UNITED STATES PATENTS

| Number | Name | Date |
|---|---|---|
| 1,643,582 | Martin | Sept. 27, 1927 |
| 1,946,155 | Foster | Feb. 6, 1934 |
| 2,236,624 | Littwin | Apr. 1, 1941 |
| 2,261,343 | De Florez et al. | Nov. 4, 1941 |